(12) United States Patent
Meng et al.

(10) Patent No.: US 11,972,543 B2
(45) Date of Patent: Apr. 30, 2024

(54) METHOD AND TERMINAL FOR IMPROVING COLOR QUALITY OF IMAGES

(71) Applicant: GUANGDONG OPPO MOBILE TELECOMMUNICATIONS CORP., LTD., Guangdong (CN)

(72) Inventors: Zibo Meng, Palo Alto, CA (US); Chiuman Ho, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 401 days.

(21) Appl. No.: 17/306,904

(22) Filed: May 3, 2021

(65) Prior Publication Data

US 2021/0256667 A1 Aug. 19, 2021

Related U.S. Application Data

(63) Continuation-in-part of application No. PCT/CN2019/106244, filed on Sep. 17, 2019.

(Continued)

(51) Int. Cl.
*G06T 5/00* (2006.01)
*G06T 5/20* (2006.01)
(Continued)

(52) U.S. Cl.
CPC .............. *G06T 5/008* (2013.01); *G06T 5/007* (2013.01); *G06T 5/20* (2013.01); *G06T 7/90* (2017.01); *G06T 11/001* (2013.01)

(58) Field of Classification Search
CPC .......... G06T 5/008; G06T 5/007; G06T 5/20; G06T 7/90; G06T 11/001;
(Continued)

(56) References Cited

U.S. PATENT DOCUMENTS

2017/0011281 A1* 1/2017 Dijkman .............. G06V 10/255
2017/0256033 A1* 9/2017 Tuzel .................... G06T 3/4046
(Continued)

FOREIGN PATENT DOCUMENTS

CN 106295139 1/2017
CN 107610146 1/2018
(Continued)

OTHER PUBLICATIONS

Learning to See in the Dark—2018 (Year: 2018).*
(Continued)

*Primary Examiner* — Nizar N Sivji
(74) *Attorney, Agent, or Firm* — Hodgson Russ LLP (57) ABSTRACT

A method includes receiving and processing a first image by an encoder-decoder network. The first image includes a first portion and a second portion located at different locations. The encoder-decoder network includes an encoder and a decoder. The encoder is configured to output at least one feature map including global information and local information such that whether a color consistency relationship between the first portion and the second portion of the first image exists is encoded into the global information and the local information. The decoder is configured to output a second image generated from the at least one feature map, wherein a first portion of the second image corresponding to the first portion of the first image and a second portion of the second image corresponding to the second portion of the first image are restored considering whether the color consistency relationship exists.

20 Claims, 3 Drawing Sheets

Related U.S. Application Data (60) Provisional application No. 62/757,644, filed on Nov. 8, 2018.

(51) Int. Cl.
*G06T 7/90* (2017.01)
*G06T 11/00* (2006.01)

(58) Field of Classification Search
CPC . G06T 2207/10024; G06T 2207/20081; G06T 2207/20084; G06N 3/045; G06N 3/08
See application file for complete search history.

(56) References Cited

U.S. PATENT DOCUMENTS

| | | | |
|---|---|---|---|
| 2017/0304732 A1 | 10/2017 | Velic et al. | |
| 2018/0314896 A1* | 11/2018 | Tao | G06V 10/255 |
| 2019/0080440 A1* | 3/2019 | Eriksson | G06T 5/008 |
| 2020/0012940 A1* | 1/2020 | Liu | H04N 7/0135 |
| 2020/0175352 A1* | 6/2020 | Cha | G06N 3/04 |
| 2021/0183030 A1* | 6/2021 | Meng | G06V 10/60 |

FOREIGN PATENT DOCUMENTS

| | | | | |
|---|---|---|---|---|
| CN | 107657257 | | 2/2018 | |
| CN | 108460739 | | 8/2018 | |
| CN | 108510456 | | 9/2018 | |
| CN | 108764235 | | 11/2018 | |
| CN | 108764235 A | * | 11/2018 | G06K 9/3241 |
| WO | WO-2018099579 A1 | * | 6/2018 | G06N 3/0454 |

OTHER PUBLICATIONS

Globally and Locally Consistent Image Completion—2017 (Year: 2017).*
Image Melding: Combining Inconsistent Images using Patch-based Synthesis—2012 (Year: 2012).*
Context-Aware Semantic Inpainting—2019 (Year: 2019).*
Rudin et al., "Nonlinear total variation based noise removal algorithms," Physica D: Nonlinear Phenomena, 1992, vol. 60, pp. 259-268.
Portilla et al., "Image denoising using scale mixtures of Gaussians in the wavelet domain," IEEE Transactions on Image Processing, 2003, vol. 12, No. 11, pp. 1338-1351.
Mairal et al., "Non-local sparse models for image restoration," IEEE 12th International Conference on Computer Vision (ICCV), 2009, pp. 2272-2279.
Gu et al., "Weighted nuclear norm minimization with application to image denoising," IEEE Conference on Computer Vision and Pattern Recognition, 2014, 8 pages.
Dabov et al., "Image denoising by sparse 3D transform-domain collaborative filtering," IEEE Transactions on Image Processing, 2007, vol. 16, No. 8, 16 pages.
Jain et al., "Natural image denoising with convolutional networks," Advances in Neural Information Processing Systems 21 (NIPS), 2008, 8 pages.
Zhang et al., "Beyond a Gaussian denoiser: Residual learning of deep CNN for image denoising," IEEE Transactions on Image Processing, 2017, 13 pages.
Hasinoff et al., "Burst photography for high dynamic range and low-light imaging on mobile cameras," ACM Transactions on Graphics, 2016, vol. 35, No. 6, 13 pages.
Liu et al., "Fast burst images denoising," ACM Transactions on Graphics, 2014, vol. 33, No. 6, 9 pages.
Dong et al., "Fast efficient algorithm for enhancement of low lighting video," In IEEE International Conference on Multimedia and Expo, 2011, 6 pages.
Malm et al., "Adaptive enhancement and noise reduction in very low light-level video," IEEE 11th International Conference on Computer Vision, 2007, 8 pages.
Łoza et al., "Automatic contrast enhancement of low-light images based on local statistics of wavelet coefficients,". Digital Signal Processing, 2013, vol. 23, No. 6, pp. 1856-1866.
Park et al., "Low-light image enhancement using variational optimization-based Retinex model," IEEE Transactions on Consumer Electronics, 2007, vol. 63, No. 2, pp. 178-184.
Guo et al., "LIME: Low-light image enhancement via illumination map estimation," IEEE Transactions on Image Processing, 2017, vol. 26, No. 2, pp. 982-993.
Chen et al., "Learning to See in the Dark," Conference on Computer Vision and Pattern Recognition, 2018, 10 pages.
Wang et al., "Multiscale structural similarity for image quality assessment," Proceedings of the 37th IEEE Asilomar Conference on Signals, Systems and Computers, 2003, 5 pages.
WIPO, International Search Report for PCT Application No. PCT/CN2019/106244, dated Dec. 18, 2019.
CNIPA, First Office Action for CN Application No. 201980069575.X, dated Sep. 2, 2022.

* cited by examiner

FIG. 1

RELATED ART

METHOD AND TERMINAL FOR IMPROVING COLOR QUALITY OF IMAGES

CROSS-REFERENCE TO RELATED APPLICATION

This application is a continuation-in-part of International Application No. PCT/CN2019/106244, filed Sep. 17, 2019, which claims priority to U.S. Provisional Application No. 62/757,644, filed Nov. 8, 2018. The entire disclosures of the aforementioned applications are incorporated herein by reference.

BACKGROUND OF THE DISCLOSURE

1. Field of the Disclosure

The present disclosure relates to the field of image processing, and more particularly, to a method and terminal for improving color quality of images.

2. Description of the Related Art

When images are captured under, for example, low-light conditions or underwater conditions, it may be hard to identify content of the image due to a low signal-to-noise ratio (SNR), low contrast, and/or a narrow dynamic range. Image denoising techniques remove image noise. Image enhancement techniques improve perceptual qualities such as contrast of images. Image denoising techniques and/or image enhancement techniques aim at providing images with vivid colors and fruitful details albeit being taking under, for example, low-light conditions or underwater conditions.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF THE EMBODIMENTS

Figure 1:
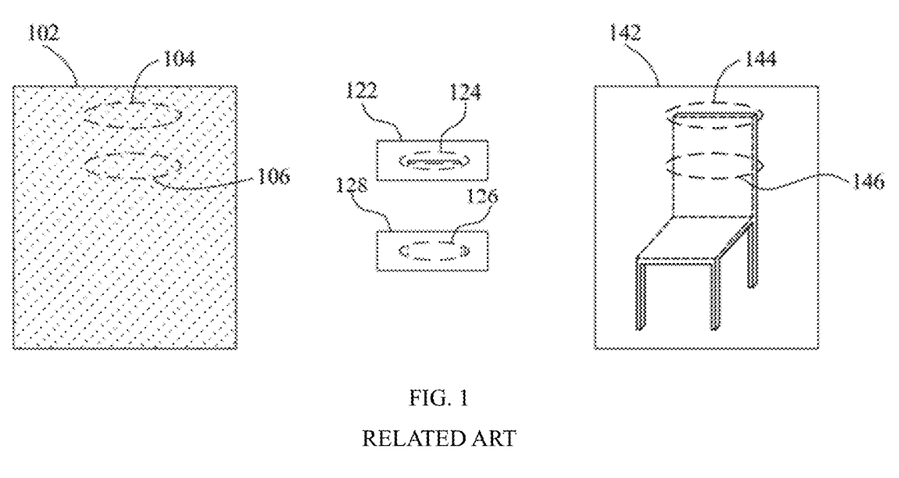
FIG. 1 is a diagram schematically illustrating an input color image, an output color image, and intermediate details for color restoration performed by the related art.

In the related art, an encoder-decoder network performs image denoising and/or enhancement on an input color image, to generate an output color image. The encoder-decoder network includes an encoder and a decoder. The encoder extracts features of the input color image, to obtain an abstract representation with color information. In order to obtain the output color image, the color information of the abstract representation needs to be restored by the decoder. FIG. 1 is a diagram schematically illustrating an input color image 102, an output color image 142, and intermediate details for color restoration performed by the related art. Referring to FIG. 1, the input color image 102 has a chair which is hard to identify due to a low SNR, low contrast, and/or a narrow dynamic range. A first portion 104 of the input color image 102 is an edge of a back of the chair, and a second portion 106 of the input color image 102 is an inner portion of the back of the chair. In the related art, when the first portion 104 of the input color image 102 and the second portion 106 of the input color image 102 are being extracted by an encoder for features, the first portion 104 of the input color image 102 is considered in a view 122 with a size of a first receptive field, which is represented by a portion 124 being processed covered by the view 122, and the second portion 106 of the input color image 102 is considered in a view 128 with the size of the first receptive field, which is represented by a portion 126 being processed covered by the view 128. However, when color information of an abstract representation is restored by a decoder, a first portion 144 of an output color image 142 corresponding to the first portion 104 of the input color image 102 and a second portion 146 of the output color image 142 corresponding to the second portion 106 of the input color image 102 may have inconsistent colors. Color inconsistency between the edge of the back of the chair and the inner portion of the back of the chair in the output color image 142 is represented by the edge of the back of the chair drawn using a dashed line style. This color inconsistency situation is known as halo. Other color inconsistency situations similar to halo such as spotted also exist for the related art.

In a first aspect of the present disclosure, a computer-implemented method is provided, which includes receiving a first color image by an encoder. The first color image includes a first portion of the first color image and a second portion of the first color image located at different locations of the first color image. The encoder processes the received first color image in such a manner that whether a color consistency relationship between the first portion of the first color image and the second portion of the first color image exists is encoded into global information and local information. The encoder outputs at least one feature map includes the global information and the local information. The encoder includes a plurality of first convolutional blocks. Each of the first convolutional blocks includes a corresponding first convolutional layer with a first receptive field, and a corresponding second convolutional layer with a second receptive field. The first receptive field and the second receptive field of each second convolutional block of the first convolutional blocks are determined using at least one of the first receptive field and the second receptive field of a corresponding first convolutional block of the first convolutional blocks. Each second convolutional block of the first convolutional blocks is subsequent to the corresponding first convolutional block of the first convolutional blocks. The first receptive field is wider than the second receptive field. The global information is obtained by the corresponding first convolutional layer of one of the first convolutional blocks, and the local information is obtained by the corresponding second convolutional layer of the one of the first convolutional blocks.

In an embodiment, the encoder causes spatial resolution of the at least one feature map to be smaller than spatial resolution of the first color image.

In an embodiment, when considering both of the first portion of the first color image and the second portion of the first color image, if first semantics can be attributed to the first portion of the first color image and the second portion of the first color image, the first semantics is encoded into the global information. When considering one of the first portion of the first color image and the second portion of the first color image, if second semantics can be attributed to the one of the first portion of the first color image and the second portion of the first color image, the second semantics is encoded into the local information.

In an embodiment, it is determined that the color consistency relationship between the first portion of the first color image and the second portion of the first color image exists, upon detecting at least one semantics is encoded into the global information and no semantics is encoded into the local information.

In an embodiment, the corresponding first convolutional layer of each of the first convolutional blocks is a dilated convolutional layer.

In an embodiment, a dilation rate of the corresponding first convolutional layer of each of the first convolutional blocks is same.

In an embodiment, an output of the corresponding first convolutional layer of each of the first convolutional blocks is concatenated with an output of the corresponding second convolutional layer of each of the first convolutional blocks. The first receptive field and the second receptive field of each second convolutional block of the first convolutional blocks are determined using a mix of the first receptive field and the second receptive field of the corresponding first convolutional block of the first convolutional blocks.

In an embodiment, the computer-implemented method further includes receiving and processing the at least one feature map by a decoder. The decoder is configured to output a second color image generated from the at least one feature map. A first portion of the second color image corresponding to the first portion of the first color image and a second portion of the second color image corresponding to the second portion of the first color image are restored considering whether the color consistency relationship between the first portion of the first color image and the second portion of the first color image exists. The decoder includes a plurality of second convolutional blocks. Each of the second convolutional blocks includes a corresponding third convolutional layer with a third receptive field. The third receptive field of each fourth convolutional block of the second convolutional blocks is determined using the third receptive field of a corresponding third convolutional block of the second convolutional blocks. Each fourth convolutional block of the second convolutional blocks is subsequent to the corresponding third convolutional block of the second convolutional blocks.

In an embodiment, each of the second convolutional blocks further includes a corresponding fourth convolutional layer with a fourth receptive field. The third receptive field and the fourth receptive field of each fourth convolutional block of the second convolutional blocks are determined correspondingly using the third receptive field and the fourth receptive field of the corresponding third convolutional block of the second convolutional blocks or using a mix of the third receptive field and the fourth receptive field of the corresponding third convolutional block of the second convolutional blocks. The third receptive field is wider than the fourth receptive field.

In an embodiment, the decoder causes spatial resolution of the second color image to be larger than spatial resolution of the at least one feature map.

In a second aspect of the present disclosure, a computer-implemented method is provided, which includes receiving at least one feature map by a decoder. The at least one feature map is extracted from a first color image. The first color image includes a first portion of the first color image and a second portion of the first color image located at different locations of the first color image. The at least one feature map including global information and local information which together indicate whether a color consistency relationship between the first portion of the first color image and the second portion of the first color image exists. The decoder generates a second color image from the at least one feature map. A first portion of the second color image corresponding to the first portion of the first color image and a second portion of the second color image corresponding to the second portion of the first color image are restored considering whether the color consistency relationship between the first portion of the first color image and the second portion of the first color image exists. The decoder outputting the second color image. The decoder includes a plurality of first convolutional blocks. Each of the first convolutional blocks includes a corresponding first convolutional layer with a first receptive field, and a corresponding second convolutional layer with a second receptive field. The first receptive field and the second receptive field of each second convolutional block of the first convolutional blocks are determined using at least one of the first receptive field and the second receptive field of a corresponding first convolutional block of the first convolutional blocks. Each second convolutional block of the first convolutional blocks is subsequent to the corresponding first convolutional block of the first convolutional blocks. The first receptive field is wider than the second receptive field.

In an embodiment, the corresponding first convolutional layer of each of the first convolutional blocks is a dilated convolutional layer.

In an embodiment, a dilation rate of the corresponding first convolutional layer of each of the first convolutional blocks is same.

In an embodiment, an output of the corresponding first convolutional layer of each of the first convolutional blocks is concatenated with an output of the corresponding second convolutional layer of each of the first convolutional blocks. The first receptive field and the second receptive field of each second convolutional block of the first convolutional blocks are determined using the mix of the first receptive field and the second receptive field of the corresponding first convolutional block of the first convolutional blocks.

In an embodiment, the decoder causes spatial resolution of the second color image to be larger than spatial resolution of the at least one feature map.

In an embodiment, the computer-implemented method further includes receiving and processing the first color image by an encoder. The encoder is configured to output the at least one feature map. The encoder includes a plurality of second convolutional blocks. Each of the second convolutional blocks includes a corresponding third convolutional layer with a third receptive field, and a corresponding fourth convolutional layer with a fourth receptive field. The third receptive field and the fourth receptive field of each fourth convolutional block of the second convolutional blocks are determined using at least one of the third receptive field and the fourth receptive field of a corresponding third convolutional block of the second convolutional blocks. Each fourth convolutional block of the second convolutional blocks is subsequent to the corresponding third convolutional block of the second convolutional blocks. The third receptive field is wider than the fourth receptive field. The global information is obtained by the corresponding third convolutional layer of one of the second convolutional blocks. The local information is obtained by the corresponding fourth convolutional layer of the one of the second convolutional blocks.

In an embodiment, the encoder causes spatial resolution of the at least one feature map to be smaller than spatial resolution of the first color image.

In an embodiment, when considering both of the first portion of the first color image and the second portion of the first color image, if first semantics can be attributed to the first portion of the first color image and the second portion of the first color image, the first semantics is encoded into the global information. When considering one of the first portion of the first color image and the second portion of the first color image, if second semantics can be attributed to the one of the first portion of the first color image and the second portion of the first color image, the second semantics is encoded into the local information.

In a third aspect of the present disclosure, a terminal is provided, which includes at least one memory and at least one processor. The at least one memory is configured to store program instructions. The at least one processor is configured to execute the program instructions, which, when being executed by the at least one memory, cause the at least one processor to perform steps including receiving a first color image by an encoder. The first color image includes at least two portions of the first color image located at different locations of the first color image. The encoder encodes whether a color consistency relationship between the at least two portions of the first color image exists into the global information and the local information. The encoder outputs at least one feature map comprising the global information and the local information. The encoder includes a plurality of first convolutional blocks. Each of the first convolutional blocks includes a corresponding first convolutional layer with a first receptive field, and a corresponding second convolutional layer with a second receptive field. The first receptive field and the second receptive field of each second convolutional block of the first convolutional blocks are determined using at least one of the first receptive field and the second receptive field of a corresponding first convolutional block of the first convolutional blocks. Each second convolutional block of the first convolutional blocks is subsequent to the corresponding first convolutional block of the first convolutional blocks. The first receptive field is wider than the second receptive field. The global information is obtained by the corresponding first convolutional layer of one of the first convolutional blocks, and the local information is obtained by the corresponding second convolutional layer of the one of the first convolutional blocks.

In an embodiment, the encoder causes spatial resolution of the at least one feature map to be smaller than spatial resolution of the first color image.

In an embodiment, when considering the at least two portions of the first color image, if first semantics can be attributed to the at least two portions of the first color image, the first semantics is encoded into the global information. When considering one of the at least two portions of the first color image, if second semantics can be attributed to the one of the at least two portions of the first color image, the second semantics is encoded into the local information.

In an embodiment, the corresponding first convolutional layer of each of the first convolutional blocks is a dilated convolutional layer.

In an embodiment, a dilation rate of the corresponding first convolutional layer of each of the first convolutional blocks is same.

In an embodiment, an output of the corresponding first convolutional layer of each of the first convolutional blocks is concatenated with an output of the corresponding second convolutional layer of each of the first convolutional blocks. The first receptive field and the second receptive field of each second convolutional block of the first convolutional blocks are determined using a mix of the first receptive field and the second receptive field of the corresponding first convolutional block of the first convolutional blocks.

In an embodiment, the steps further include receiving and processing the at least one feature map by a decoder. The decoder is configured to output a second color image generated from the at least one feature map. The at least two portions of the second color image respectively corresponding to the at least two portions of the first color image are restored considering whether the color consistency relationship between the at least two portions of the first color image exists. The decoder includes a plurality of second convolutional blocks. Each of the second convolutional blocks includes a corresponding third convolutional layer with a third receptive field. The third receptive field of each fourth convolutional block of the second convolutional blocks is determined using the third receptive field of a corresponding third convolutional block of the second convolutional blocks. Each fourth convolutional block of the second convolutional blocks is subsequent to the corresponding third convolutional block of the second convolutional blocks.

In an embodiment, each of the second convolutional blocks further includes a corresponding fourth convolutional layer with a fourth receptive field.

In an embodiment, the third receptive field and the fourth receptive field of each fourth convolutional block of the second convolutional blocks are determined correspondingly using the third receptive field and the fourth receptive field of the corresponding third convolutional block of the second convolutional blocks or using a mix of the third receptive field and the fourth receptive field of the corresponding third convolutional block of the second convolutional blocks. The third receptive field is wider than the fourth receptive field.

In an embodiment, the decoder causes spatial resolution of the second color image to be larger than spatial resolution of the at least one feature map.

In a fourth aspect of the present disclosure, a terminal is provided, which includes at least one memory and at least one processor. The at least one memory is configured to store program instructions. The at least one processor is configured to execute the program instructions, which, when being executed by the at least one memory, cause the at least one processor to perform steps including receiving at least one feature map by a decoder. The at least one feature map is extracted from a first color image. The first color image includes at least two portions of the first color image located at different locations of the first color image. The at least one feature map including global information and local information which together indicate whether a color consistency relationship between the at least two portions of the first color image exists. The decoder generates a second color image from the at least one feature map. The at least two portions of the second color image respectively corresponding to the at least two portions of the first color image are restored considering whether the color consistency relationship between the at least two portions of the first color image exists. The decoder outputs the second color image. The decoder includes a plurality of first convolutional blocks. Each of the first convolutional blocks includes a corresponding first convolutional layer with a first receptive field, and a corresponding second convolutional layer with a second receptive field. The first receptive field and the second receptive field of each second convolutional block of the first convolutional blocks are determined using at least one of the first receptive field and the second receptive field of a corresponding first convolutional block of the first convolutional blocks. Each second convolutional block of the first convolutional blocks is subsequent to the corresponding first convolutional block of the first convolutional blocks. The first receptive field is wider than the second receptive field.

In an embodiment, the corresponding first convolutional layer of each of the first convolutional blocks is a dilated convolutional layer.

In an embodiment, a dilation rate of the corresponding first convolutional layer of each of the first convolutional blocks is same.

In an embodiment, an output of the corresponding first convolutional layer of each of the first convolutional blocks is concatenated with an output of the corresponding second convolutional layer of each of the first convolutional blocks. The first receptive field and the second receptive field of each second convolutional block of the first convolutional blocks are determined using the mix of the first receptive field and the second receptive field of the corresponding first convolutional block of the first convolutional blocks.

In an embodiment, the decoder causes spatial resolution of the second color image to be larger than spatial resolution of the at least one feature map.

In an embodiment, the steps further include receiving and processing the first color image by an encoder. The encoder is configured to output the at least one feature map. The encoder includes a plurality of second convolutional blocks. Each of the second convolutional blocks includes a corresponding third convolutional layer with a third receptive field, and a corresponding fourth convolutional layer with a fourth receptive field. The third receptive field and the fourth receptive field of each fourth convolutional block of the second convolutional blocks are determined using at least one of the third receptive field and the fourth receptive field of a corresponding third convolutional block of the second convolutional blocks. Each fourth convolutional block of the second convolutional blocks is subsequent to the corresponding third convolutional block of the second convolutional blocks. The third receptive field is wider than the fourth receptive field. The global information is obtained by the corresponding third convolutional layer of one of the second convolutional blocks. The local information is obtained by the corresponding fourth convolutional layer of the one of the second convolutional blocks.

In an embodiment, the encoder causes spatial resolution of the at least one feature map to be smaller than spatial resolution of the first color image.

In an embodiment, when considering the at least two portions of the first color image, if first semantics can be attributed to the at least two portions of the first color image, the first semantics is encoded into the global information. When considering one of the at least two portions of the first color image, if second semantics can be attributed to the one of the at least two portions of the first color image, the second semantics is encoded into the local information.

In a fifth aspect of the present disclosure, a non-transitory computer-readable medium with program instructions stored thereon is provided. When the program instructions are executed by at least one processor, the at least one processor is caused to perform steps including: receiving and processing a first color image by an encoder. The first color image includes a first portion of the first color image and a second portion of the first color image located at different locations of the first color image. The encoder is configured to output at least one feature map including global information and local information such that whether a color consistency relationship between the first portion of the first color image and the second portion of the first color image exists is encoded into the global information and the local information. The encoder includes a plurality of first convolutional blocks. Each of the first convolutional blocks includes a corresponding first convolutional layer with a first receptive field, and a corresponding second convolutional layer with a second receptive field. The first receptive field and the second receptive field of each second convolutional block of the first convolutional blocks are determined using at least one of the first receptive field and the second receptive field of a corresponding first convolutional block of the first convolutional blocks. Each second convolutional block of the first convolutional blocks is subsequent to the corresponding first convolutional block of the first convolutional blocks. The first receptive field is wider than the second receptive field. The global information is obtained by the corresponding first convolutional layer of one of the first convolutional blocks, and the local information is obtained by the corresponding second convolutional layer of the one of the first convolutional blocks.

In a sixth aspect of the present disclosure, a non-transitory computer-readable medium with program instructions stored thereon is provided. When the program instructions are executed by at least one processor, the at least one processor is caused to perform steps including: receiving and processing at least one feature map by a decoder. The at least one feature map is extracted from a first color image. The first color image includes a first portion of the first color image and a second portion of the first color image located at different locations of the first color image. The at least one feature map including global information and local information such that whether a color consistency relationship between the first portion of the first color image and the second portion of the first color image exists is encoded into the global information and the local information. The decoder is configured to output a second color image generated from the at least one feature map. A first portion of the second color image corresponding to the first portion of the first color image and a second portion of the second color image corresponding to the second portion of the first color image are restored considering whether the color consistency relationship between the first portion of the first color image and the second portion of the first color image exists. The decoder includes a plurality of first convolutional blocks. Each of the first convolutional blocks includes a corresponding first convolutional layer with a first receptive field, and a corresponding second convolutional layer with a second receptive field. The first receptive field and the second receptive field of each second convolutional block of the first convolutional blocks are determined using at least one of the first receptive field and the second receptive field of a corresponding first convolutional block of the first convolutional blocks.

Each second convolutional block of the first convolutional blocks is subsequent to the corresponding first convolutional block of the first convolutional blocks. The first receptive field is wider than the second receptive field. Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the invention.

As used here, the term "using" refers to a case in which an object is directly employed for performing a step, or a case in which the object is modified by at least one intervening step and the modified object is directly employed to perform the step.

Figure 2:
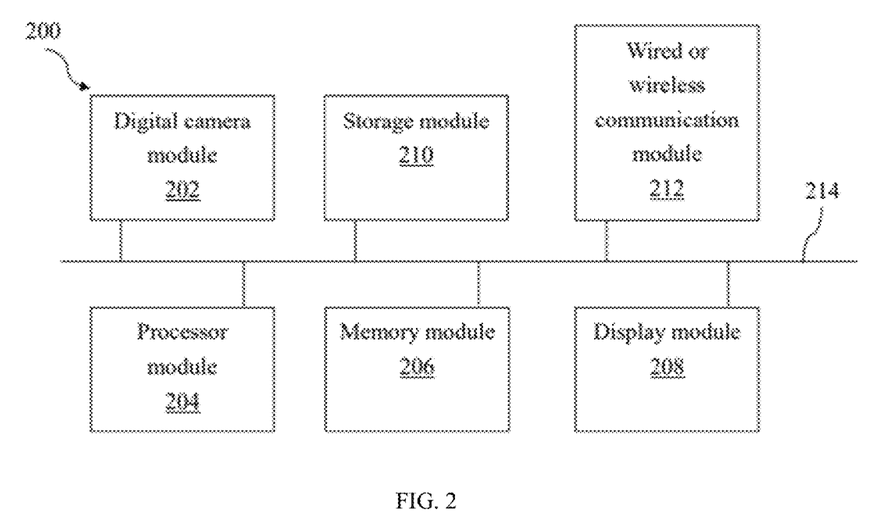
FIG. 2 is a block diagram illustrating inputting, processing, and outputting hardware modules in a terminal in accordance with an embodiment of the present disclosure.

FIG. 2 is a block diagram illustrating inputting, processing, and outputting hardware modules in a terminal 200 in accordance with an embodiment of the present disclosure. Referring to FIG. 2, the terminal 200 includes a digital camera module 202, a processor module 204, a memory module 206, a display module 208, a storage module 210, a wired or wireless communication module 212, and a bus 214. The terminal 200 may be cell phones, smartphones, tablets, notebook computers, desktop computers, or any electronic device having enough computing power to perform image processing.

The digital camera module 202 is an inputting hardware module and is configured to capture an input color image $I_{306}$ (labeled in FIG. 3) that is to be transmitted to the processor module 204 through the bus 214. The input color image $I_{306}$ may be a raw image with pixels arranged in a Bayer pattern. Alternatively, the input color image $I_{306}$ may be obtained using another inputting hardware module, such as the storage module 210, or the wired or wireless communication module 212. The storage module 210 is configured to store an input color image $I_{306}$ that is to be transmitted to the processor module 204 through the bus 214. The wired or wireless communication module 212 is configured to receive an input color image $I_{306}$ from a network through wired or wireless communication, wherein the input color image $I_{306}$ is to be transmitted to the processor module 204 through the bus 214.

When the input color image is captured, for example, under a low-light condition or an underwater condition, or with an insufficient amount of exposure time, it may be hard to identify content of the input color image due to a low signal-to-noise ratio (SNR), low contrast, and/or a narrow dynamic range. The memory module 206 may be a transitory or non-transitory computer-readable medium that includes at least one memory storing program instructions that, when executed by the processor module 204, cause the processor module 204 to process the input color image. The processor module 204 implements an encoder-decoder network 300 (shown in FIG. 3) that performs image denoising and/or enhancement on the input color image $I_{306}$ and generate an output color image $I_{308}$ (labeled in FIG. 3). The processor module 204 includes at least one processor that sends signals directly or indirectly to and/or receives signals directly or indirectly from the digital camera module 202, the memory module 206, the display module 208, the storage module 210, and the wired or wireless communication module 212 via the bus 214.

Figure 3:
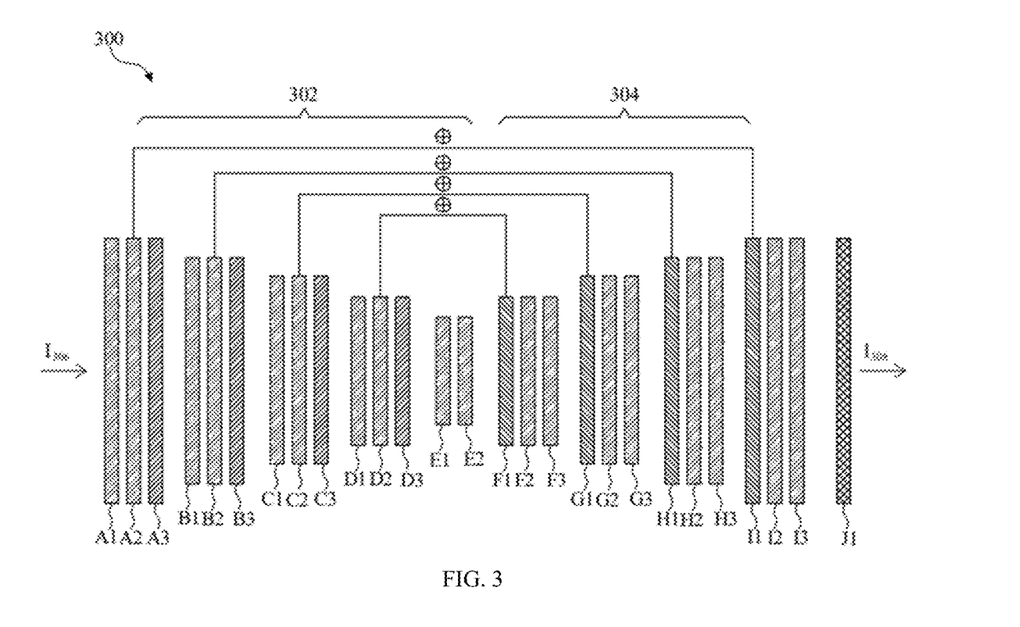
FIG. 3 is a diagram illustrating an encoder-decoder network for image denoising and/or enhancement in accordance with an embodiment of the present disclosure.

The display module 208 is an outputting hardware module and is configured to display the output color image $I_{308}$ that is received from the processor module 204 through the bus 214. Alternatively, the output color image $I_{308}$ may be output using another outputting hardware module, such as the storage module 210, or the wired or wireless communication module 212. The storage module 210 is configured to store the output color image $I_{308}$ that is received from the processor module 204 through the bus 214. The wired or wireless communication module 212 is configured to transmit the output color image $I_{308}$ to the network through wired or wireless communication, wherein the output color image $I_{308}$ is received from the processor module 204 through the bus 214.

The terminal 200 is one type of system all of components of which are integrated together by the bus 214. Other types of computing systems such as a system that has a remote digital camera module instead of the digital camera module 202 are within the contemplated scope of the present disclosure.

FIG. 3 is a diagram illustrating an encoder-decoder network 300 for image denoising and/or enhancement in accordance with an embodiment of the present disclosure. The encoder-decoder network 300 is implemented by a processor module 204 (shown in FIG. 2) to perform image denoising and/or enhancement on the input image $I_{306}$, to generate the output image $I_{308}$. Given an input image I, the encoder-decoder network 300 learns a mapping I'=f(I:w) that renders the input image I denoised and/or enhanced, to generate an output image I', where w is a set of learnable parameters of the encoder-decoder network 300. The encoder-decoder network 300 with learned parameters performs image denoising and/or enhancement on the input color image $I_{306}$, to generate the output color image $I_{308}$.

The encoder-decoder network 300 includes an encoder 302 and a decoder 304. The encoder 302 extracts feature of the input color image $I_{306}$, to obtain an abstract representation with color information. In order to obtain the output color image $I_{308}$, the color information of the abstract representation needs to be restored by the decoder 304.

Referring to FIG. 3, in an embodiment, the encoder-decoder network 300 has a U-net architecture. The encoder 302 is configured to output at least one feature map including global information and local information such that whether a color consistency relationship between a first portion of the input color image $I_{306}$ and a second portion of the input color image $I_{306}$ exists is encoded into the global information and the local information. The first portion of the input color image $I_{306}$ and the second portion of the input color image $I_{306}$ are located at different locations of the input color image $I_{306}$. In an embodiment, the at least one feature map is a multi-channel feature map. The encoder 302 includes a plurality of stages A to E. Each of the stages A to E includes a seeing wider convolutional block X1 and a seeing wider convolutional block X2 following the seeing wider convolutional block X1, wherein X is any of A to E. Each of the stages A to D further includes a pooling layer X3 following the seeing wider convolutional block X2, wherein X is any of A to D. The pooling player X3 is configured to decrease spatial resolution of the respective feature map. In an embodiment, the pooling layer X3 is a max pooling layer. Because the pooling layer X3 exists in each of the stages A to D, spatial resolution decreases stage by stage from the stage A to the stage D, so spatial resolution of the at least one feature map is smaller than spatial resolution of the input color image $I_{306}$. A number of channels increases stage by stage from the stage A to the stage E, so a number of channels of the at least one feature map is more than a number of channels of the input color image $I_{306}$.

The decoder 304 is configured to output the output color image $I_{308}$ generated from the at least one feature map, wherein a first portion of the output color image $I_{308}$ corresponding to the first portion of the input color image $I_{306}$ and a second portion of the output color image $I_{308}$ corresponding to the second portion of the input color image $I_{306}$ are restored considering whether the color consistency relationship between the first portion of the input color image $I_{306}$ and the second portion of the input color image $I_{306}$ exists. In an embodiment, the output color image $I_{308}$ is an RGB image. The decoder 304 includes a plurality of stages F to J. Each of the stages F to I includes an upscaling layer X1, a seeing wider block X2 following the upscaling layer X1, and a seeing wider block X3 following the seeing wider block X2, wherein X is any of F to I. The upscaling layer X1 is configured to increase spatial resolution of the at least one feature map. In an embodiment, the upscaling layer X1 is an upsampling layer that performs, for example, linear interpolation or bilinear interpolation. Alternatively, the upscaling layer X1 is a deconvolutional layer. The stage J includes a vanilla convolutional layer J1. Because the upscaling layer X1 exists in each of the stages F to I, spatial resolution increases stage by stage from the stage F to the stage I, so the spatial resolution of the at least one feature map is larger than spatial resolution of the output color image $I_{308}$. A number of channels decreases stage by stage from the stage F to the stage J, so the number of channels of the at least one feature map is fewer than a number of channels of the output color image $I_{308}$.

In the above embodiments, in each of the stages F to I of the decoder 304, the seeing wider convolutional blocks X2 and X3 are used. Other structures such as a decoder using vanilla convolutional layers instead of the seeing wider convolutional blocks X2 and X3 are within the contemplated scope of the present disclosure.

Examples of the U-net architecture are described in more detail in "U-net: Convolutional networks for biomedical image segmentation," O. Ronneberger, P. Fischer, and T. Brox, *arXiv preprint arXiv:* 1505.04597 [cs.CV], 2015. In the above embodiment, the encoder-decoder network 300 has the U-net architecture. Other architectures such as an encoder-decoder network having substantially same spatial resolution throughout an encoder and a decoder are within the contemplated scope of the present disclosure.

Figure 4:
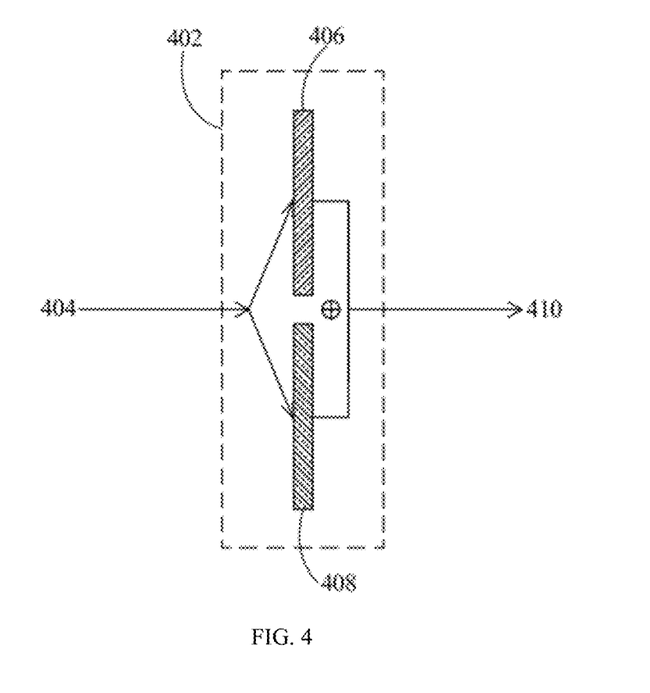
FIG. 4 is a diagram illustrating a seeing wider convolutional block in the encoder-decoder network in accordance with an embodiment of the present disclosure.

FIG. 4 is a diagram illustrating the seeing wider convolutional block 402 in the encoder-decoder network 300 in accordance with an embodiment of the present disclosure. Referring to FIGS. 3 and 4, the seeing wider convolutional block 402 illustrates an internal structure of each of the seeing wider convolutional blocks A1 and A2 to E1 and E2, and F2 and F3 to 12 and 13. The seeing wider convolutional block 402 includes a dilated convolutional layer 406 and a vanilla convolutional layer 408. The dilated convolutional layer 406 performs a dilated convolution operation and a non-linear activation function operation on an input 404 to the dilated convolutional layer 406. In an embodiment, a dilation rate of a corresponding dilated convolutional layer 406 of each of the seeing wider convolutional blocks A1 and A2 to E1 and E2, and F2 and F3 to 12 and 13 is same. In an embodiment, the dilation rate is 4. In an embodiment, the non-linear activation function operation is a Leaky ReLU operation. Alternatively, the dilation rate of the corresponding dilated convolutional layer 406 of each of the seeing wider convolutional blocks A1 and A2 to E1 and E2, and F2 and F3 to 12 and 13 is individually adjustable. A goal of the adjustment is to facilitate color consistency for, for example, situations described with reference to FIG. 1. The vanilla convolutional layer 408 performs a vanilla convolution operation and a non-linear activation function operation on the input 404 to the vanilla convolutional layer 408. In an embodiment, the vanilla convolution operation is a 3×3 convolution operation. In an embodiment, the non-linear activation function operation is a Leaky ReLU operation.

An output of the dilated convolutional layer 406 is concatenated with an output of the vanilla convolutional layer 408, to form a multi-channel feature map 410. A channel of the multi-channel feature map 410 corresponding to the output of the dilated convolutional layer 406 and a channel of the multi-channel feature map 410 corresponding to the output of the vanilla convolutional layer 408 may commonly contribute to one channel of a multi-channel feature map obtained by a subsequent seeing wider convolutional block 402. For example, an output of the dilated convolutional layer 406 of the seeing wider convolutional block A1 is concatenated with an output of the vanilla convolutional layer 408 of the seeing wider convolutional block A1, to generate a multi-channel feature map 410 of the seeing wider convolutional block A1. The dilated convolutional layer 406 of the subsequent seeing wider convolutional block A2 performs the dilated convolution operation that convolves and sums a channel of the multi-channel feature map 410 of the seeing wider convolutional block A1 corresponding to the output of the dilated convolutional layer 406 of the seeing wider convolutional block A1, and a channel of the multi-channel feature map 410 of the seeing wider convolutional block A1 corresponding to the output of the vanilla convolutional layer 408 of the seeing wider convolutional block A1, to generate a channel of a multi-channel feature map 410 of the seeing wider convolutional block A2. The vanilla convolutional layer 408 of the subsequent seeing wider convolutional block A2 performs the vanilla convolution operation that convolves and sums the channel of the multi-channel feature map 410 of the seeing wider convolutional block A1 corresponding to the output of the dilated convolutional layer 406 of the seeing wider convolutional block A1, and the channel of the multi-channel feature map 410 of the seeing wider convolutional block A1 corresponding to the output of the vanilla convolutional layer 408 of the seeing wider convolutional block A1, to generate another channel of the multi-channel feature map 410 of the seeing wider convolutional block A2. Similarly, one channel of a multi-channel feature map 410 of the seeing wider convolutional block B1 is commonly contributed by an output of the dilated convolutional layer 406 of the seeing wider convolutional block A2 and an output of the vanilla convolutional layer 408 of the seeing wider convolutional block A2.

A receptive field of the dilated convolutional layer 406 is wider than a receptive field of the vanilla convolutional layer 408. The receptive field of the dilated convolutional layer 406 of each second seeing wider convolutional block (e.g. A2 or B1) of the seeing wider convolutional blocks A1 and A2 to E1 and E2, and F2 and F3 to 12 and 13 is determined using a mix of the receptive field of the dilated convolutional layer 406 and the receptive field of the vanilla convolutional layer 408 of a corresponding first seeing wider convolutional block (e.g. A1 or A2) of the seeing wider convolutional blocks A1 and A2 to E1 and E2, and F2 and F3 to 12 and 13. The receptive field of the vanilla convolutional layer 408 of each second seeing wider convolutional block (e.g. A2 or B1) of the seeing wider convolutional blocks A1 and A2 to E1 and E2, and F2 and F3 to 12 and 13 is also determined using a mix of the receptive field of the dilated convolutional layer 406 and the receptive field of the vanilla convolutional layer 408 of the corresponding first seeing wider convolutional block (e.g. A1 or A2) of the seeing wider convolutional blocks A1 and A2 to E1 and E2, and F2 and F3 to I2 and I3. Each second seeing convolutional block (e.g. A2 or B1) of the seeing wider convolutional blocks A1 and A2 to E1 and E2, and F2 and F3 to I2 and I3 is subsequent to the corresponding first seeing wider convolutional block (e.g. A1 or A2) of the seeing wider convolutional blocks A1 and A2 to E1 and E2, and F2 and F3 to I2 and I3. The second seeing wider convolutional block of the seeing wider convolutional blocks A1 and A2 to E1 and E2, and F2 and F3 to I2 and I3 may be any of A2, B1, B2, C1, C2, D1, D2, E1, E2, F3, G2, G3, H2, H3, I2 and $I_3$ (shown in FIG. 3), and the corresponding first seeing wider convolutional block of the seeing wider convolutional blocks A1 and A2 to E1 and E2, and F2 and F3 to I2 and I3 may be any of A1, A2, B1, B2, C1, C2, D1, D2, E1, F2, F3, G2, G3, H2, H3 and I2 (shown in FIG. 3), respectively. For example, when the second seeing wider convolutional block of the seeing wider convolutional blocks A1 and A2 to E1 and E2, and F2 and F3 to I2 and I3 is A2, the corresponding first seeing wider convolutional block of the seeing wider convolutional blocks A1 and A2 to E1 and E2, and F2 and F3 to I2 and I3 is A1.

In the above embodiments, the seeing wider convolutional block 402 uses the dilated convolutional layer 406 that has the receptive field wider than the receptive field of the vanilla convolutional layer 408. Other convolutional layers that have a wider receptive field such as another vanilla convolutional layer having a receptive field wider than the receptive field of the vanilla convolutional layer 408 are within the contemplated scope of the present disclosure. Furthermore, the receptive field of the dilated convolutional layer 406 or the vanilla convolutional layer 408 of the second seeing wider convolutional block (e.g. A2 or B1) is determined using the mix of the receptive field of the dilated convolutional layer 406 and the receptive field of the vanilla convolutional layer 408 of the corresponding first seeing wider convolutional block (e.g. A1 or A2). Other ways to determine a receptive field of a dilated convolutional layer and a receptive field of a vanilla convolutional layer such as to determine the receptive field of the dilated convolutional layer of a second seeing wider convolutional block using a receptive field of a dilated convolutional layer of a first seeing wider convolutional block, and the receptive field of the vanilla convolutional layer of the second seeing wider convolutional block using a receptive field of a vanilla convolutional layer of the first seeing wider convolutional block are within the contemplated scope of the present disclosure.

Figure 5:
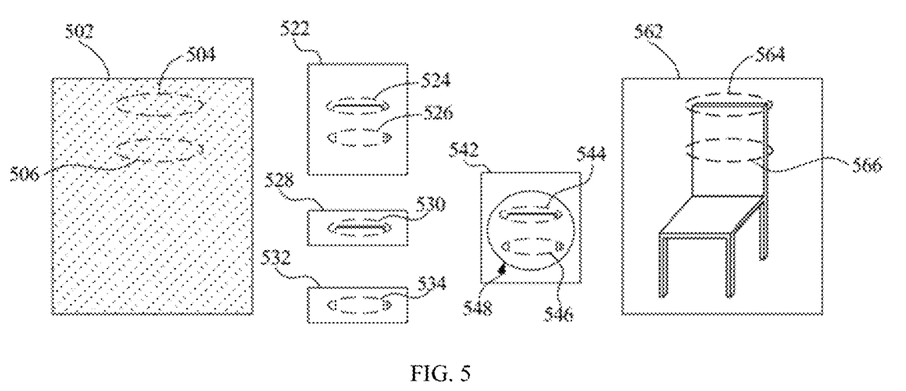
FIG. 5 is a diagram schematically illustrating an input color image, an output color image, and intermediate details for color restoration performed by the encoder-decoder network in accordance with an embodiment of the present disclosure.

FIG. 5 is a diagram schematically illustrating an input color image 502, an output color image 562, and intermediate details for color restoration performed by the encoder-decoder network 300 in accordance with an embodiment of the present disclosure. Referring to FIGS. 3, 4, and 5, the input color image 502 has a chair with a plain back. The chair in the input color image 502 is hard to identify due to a low SNR, low contrast, and/or a narrow dynamic range. A first portion 504 of the input color image 502 is an edge of a back of the chair, and a second portion 506 of the input color image 502 is an inner portion of the back of the chair. The encoder 302 is configured to output at least one feature map including global information and local information such that whether a color consistency relationship between the first portion 504 of the input color image 502 and the second portion 506 of the input color image 502 exists is encoded into the global information and the local information. A portion of the global information is located in a channel 542 of the at least one feature map corresponding to the dilated convolutional layer 406 of the seeing wider convolutional block E2. A portion of the local information is located in a channel (not shown) of the at least one feature map corresponding to the vanilla convolutional layer 408 of the seeing wider convolutional block E2.

When the first portion 504 of the input color image 502 and the second portion 506 of the input color image 502 are being extracted by the encoder 302 for features, the first portion 504 of the input color image 502 and the second portion 506 of the input color image 502 are directly or indirectly considered in a view 522 with a size of a first receptive field at a bottleneck of the encoder-decoder network 300, which is represented by a portion 524 being processed and a portion 526 being processed covered by the view 522. For simplicity, in the examples in FIGS. 5 and 6, only at least one portion being processed, which corresponds to at least one of the first portion of the input color image and the second portion of the input color image, in a view is shown, and the other portion being processed in the view are not shown. The bottleneck of the encoder-decoder network 300 is the seeing wider convolutional block E2. The first receptive field is the receptive field of the dilated convolutional layer 406 of the seeing wider convolutional block E2. When considering both of the first portion 504 of the input color image 502 and the second portion 506 of the input color image 502 in the view 522, if first semantics can be attributed to the first portion 504 of the input color image 502 and the second portion 506 of the input color image 502, the first semantics is encoded into the global information. In the example in FIG. 5, when considering both of the first portion 504 of the input color image 502 and the second portion 506 of the input color image 502 in the view 522, "the back of the chair" 548 can be attributed to the first portion 504 of the input color image 502 and the second portion 506 of the input color image 502, and therefore, the "back of the chair" 548 is the first semantics that is encoded into the global information. The "back of the chair" 548 being encoded into the global information is represented by a portion 544 corresponding to the first portion 504 of the input color image 502 and a portion 546 corresponding to the second portion 506 of the input color image 502 circled together in the channel 542 of the at least one feature map.

When the first portion 504 of the input color image 502 and the second portion 506 of the input color image 502 are being extracted by the encoder 302 for features, the first portion 504 of the input color image 502 and the second portion 506 of the input color image 502 are directly or indirectly considered in corresponding views 528 and 532 with a size of a second receptive field at a bottleneck of the encoder-decoder network 300, which is represented by a portion 530 being processed covered by the view 528 and a portion 534 being processed covered by the view 532. The second receptive field is the receptive field of the vanilla convolutional layer 408 of the seeing wider convolutional block E2. When considering one of the first portion 504 of the input color image 502 and the second portion 506 of the input color image 502 in the view 528 or 532, if second semantics can be attributed to the one of the first portion 504 of the input color image 502 and the second portion 506 of the input color image 502, the second semantics is encoded into the local information. In the example in FIG. 5, when considering one of the first portion 504 of the input color image 502 and the second portion 506 of the input color image 502 in the view 528 or 532, no semantics can be attributed to the first portion 504 of the input color image 502 or the second portion 506 of the input color image 502, and therefore, no semantics attributed to the first portion 504 of the input color image 502 or the second portion 506 of the input color image 502 is encoded into the local information.

The first semantics encoded into the global information and the local information without any semantics attributed to the first portion 504 of the input color image 502 or the second portion 506 of the input color image 502 indicate whether the color consistency relationship between the first portion 504 of the input color image 502 and the second portion 506 of the input color image 502 exists. The decoder 304 is configured to output an output color image 562 generated from the at least one feature map, wherein a first portion 564 of the output color image 562 corresponding to the first portion 504 of the input color image 502 and a second portion 566 of the output color image 562 corresponding to the second portion 506 of the input color image 502 are restored considering whether the color consistency relationship between the first portion 504 of the input color image 502 and the second portion 506 of the input color image 502 exists. In the example in FIG. 5, when color information of the at least one feature map is restored by the decoder 304, the global information and the local information are considered together. Because the "back of the chair" 548 is encoded into the global information and the local information does not have any semantics attributed to the first portion 504 of the input color image 502 or the second portion 506 of the input color image 502, the color consistency relationship exists between the first portion 504 of the input color image 502 and the second portion 506 of the input color image 502. Therefore, the first portion 564 of the output color image 562 and the second portion 566 of the output color image 562 are restored to have a same color. Color consistency between the edge of the back of the chair and the inner portion of the back of the chair in the output color image 562 is represented by the edge of the back of the chair drawn using a solid line style.

Figure 6:
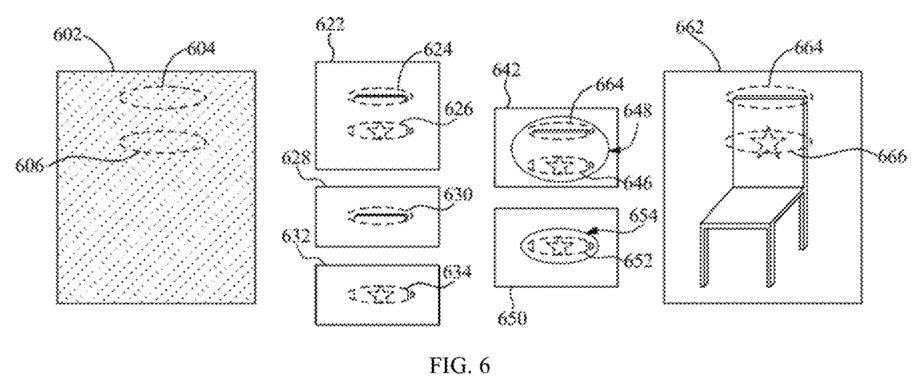
FIG. 6 is a diagram schematically illustrating another input color image, another output color image, and other intermediate details for color restoration performed by the encoder-decoder network in accordance with an embodiment of the present disclosure.

FIG. 6 is a diagram schematically illustrating another input color image 602, another output color image 662, and other intermediate details for color restoration performed by the encoder-decoder network 300 in accordance with an embodiment of the present disclosure. Referring to FIGS. 3, 4, and 6, the input color image 602 has a chair with a back decorated with a star. The chair in the input color image 602 is hard to identify due to a low SNR, low contrast, and/or a narrow dynamic range. A first portion 604 of the input color image 602 is an edge of a back of the chair, and a second portion 606 of the input color image 602 is a decorated star portion of the back of the chair. The encoder 302 is configured to output at least one feature map including global information and local information such that whether a color consistency relationship between the first portion 604 of the input color image 602 and the second portion 606 of the input color image 602 exists is encoded into the global information and the local information. A portion of the global information is located in a channel 642 of the at least one feature map corresponding to the dilated convolutional layer 406 of the seeing wider convolutional block E2. A portion of the local information is located in a channel 650 of the at least one feature map corresponding to the vanilla convolutional layer 408 of the seeing wider convolutional block E2.

When the first portion 604 of the input color image 602 and the second portion 606 of the input color image 602 are being extracted by the encoder 302 for features, the first portion 604 of the input color image 602 and the second portion 606 of the input color image 602 are directly or indirectly considered in a view 622 with a size of a first receptive field at a bottleneck of the encoder-decoder network 300, which is represented by a portion 624 being processed and a portion 626 being processed covered by the view 622. The bottleneck of the encoder-decoder network 300 is the seeing wider convolutional block E2. The first receptive field is the receptive field of the dilated convolutional layer 406 of the seeing wider convolutional block E2. When considering both of the first portion 604 of the input color image 602 and the second portion 606 of the input color image 602 in the view 622, if first semantics can be attributed to the first portion 604 of the input color image 602 and the second portion 606 of the input color image 602, the first semantics is encoded into the global information. In the example in FIG. 6, when considering both of the first portion 604 of the input color image 602 and the second portion 606 of the input color image 602 in the view 622, "the back of the chair" 648 can be attributed to the first portion 604 of the input color image 602 and the second portion 606 of the input color image 602, and therefore, the "back of the chair" 648 is the first semantics that is encoded into the global information. The "back of the chair" 648 being encoded into the global information is represented by a portion 664 corresponding to the first portion 604 of the input color image 602 and a portion 646 corresponding to the second portion 606 of the input color image 602 circled together in the channel 642 of the at least one feature map.

When the first portion 604 of the input color image 602 and the second portion 606 of the input color image 602 are being extracted by the encoder 302 for features, the first portion 604 of the input color image 602 and the second portion 606 of the input color image 602 are directly or indirectly considered in corresponding views 628 and 632 with a size of a second receptive field at a bottleneck of the encoder-decoder network 300, which is represented by a portion 630 being processed covered by the view 628 and a portion 634 being processed covered by the view 632. The second receptive field is the receptive field of the vanilla convolutional layer 408 of the seeing wider convolutional block E2. When considering one of the first portion 604 of the input color image 602 and the second portion 606 of the input color image 602 in the view 628 or 632, if second semantics can be attributed to the one of the first portion 604 of the input color image 602 and the second portion 606 of the input color image 602, the second semantics is encoded into the local information. In the example in FIG. 6, when considering the first portion 604 of the input color image 602 in the view 628, no semantics can be attributed to the first portion 604 of the input color image 602, and therefore no semantics attributed to the first portion 604 of the input color image 602 is encoded into the local information. When considering the second portion 606 of the input color image 602 in the view 632, the "star" 654 can be attributed to the second portion 606 of the input color image 602, and therefore, the "star" 654 is the second semantics encoded into the local information. The "star" 654 being encoded into the local information is represented by a portion 652 corresponding to the second portion 606 of the input color image 602 circled in the channel 650 of the at least one feature map.

The first semantics encoded into the global information and the second semantics encoded into the local information indicate whether the color consistency relationship between the first portion 604 of the input color image 602 and the second portion 606 of the input color image 602 exists. The decoder 304 is configured to output an output color image 662 generated from the at least one feature map, wherein a first portion 664 of the output color image 662 corresponding to the first portion 604 of the input color image 602 and a second portion 666 of the output color image 662 corresponding to the second portion 606 of the input color image 602 are restored considering whether the color consistency relationship between the first portion 604 of the input color image 602 and the second portion 606 of the input color image 602 exists. In the example in FIG. 6, when color information of the at least one feature map is restored by the decoder 304, the global information and the local information are considered together. Because the "back of the chair" 648 is encoded into the global information and the "star" 654 is encoded into the local information, the color consistency relationship does not exist between the first portion 604 of the input color image 602 and the second portion 606 of the input color image 602. Therefore, the first portion 664 of the output color image 662 and the second portion 666 of the output color image 662 are restored to have different colors. Color inconsistency between the edge of the back of the chair and the decorated star portion of the back of the chair in the output color image 562 due to fine details reflected locally is represented by the edge of the back of the chair drawn using the solid line style and the star drawn using a dashed line style. The global information and the local information indicate whether the color consistency relationship between the first portion of the input color image and the second portion of the input color image exists. For example, it may be determined that the color consistency relationship between the first portion of the input color image and the second portion of the input color image exists when at least one semantic is encoded into the global information and no semantics is encoded into the local information. For another example, it may be determined that the color consistency relationship between the first portion of the input color image and the second portion of the input color image does not exist when at least one semantic is encoded into the global information and at least one semantic is encoded into the local information. For another example, it may also be determined that the color consistency relationship between the first portion of the input color image and the second portion of the input color image does not exist when no semantics is encoded into the global information and at least one semantic is encoded into the local information. For another example, it may also be determined that the color consistency relationship between the first portion of the input color image and the second portion of the input color image does not exist when no semantics is encoded into the global information and no semantics is encoded into the local information. It should be noted that it is also the case for more than two portions of the input color image located at different positions of the input color image.

In addition, referring to FIG. 3, in an embodiment, feature maps output by the upscaling layer F1 of the decoder 304 and the seeing wider convolutional block D2 of the encoder 302 have substantially same spatial resolution. Similarly, feature maps of the upscaling layer G1 and the seeing wider convolutional block C2, feature maps of the upscaling layer H1 and the seeing wider convolutional block B2, and feature maps of the upscaling layer I1 and the seeing wider convolutional block A2 have substantially same corresponding spatial resolution. The feature maps of the upscaling layer F1 and the seeing wider convolutional block D2 are concatenated together and input to the seeing wider convolutional block F2. Similarly, the feature maps of the upscaling layer G1 and the seeing wider convolutional block C2, the feature maps of the upscaling layer H1 and the seeing wider convolutional block B2, and the feature maps of the upscaling layer I1 and the seeing wider convolutional block A2 are correspondingly concatenated together and correspondingly input to the seeing wider convolutional blocks G2, H2, and I2.

Furthermore, in an embodiment, during training, the input color image $I_{306}$ of the encoder-decoder network 300 is a short-exposure color image captured under, for example, a low-light condition or an underwater condition. A loss function is calculated between the output color image $I_{308}$ of the encoder-decoder network 300 and a ground-truth image which is a corresponding long-exposure color image. The loss function is a weighted joint loss of $l_1$ and multi-scale structured similarity index (MS-SSIM), which is defined by equation (1):

$$L = \lambda L^{l_1} + (1-\lambda) L^{MS\text{-}SSIM} \tag{1}$$

where $\lambda$ is set to 0.16 empirically, $L^{l_1}$ is the $l_1$ loss defined by equation (2), and $L^{MS\text{-}SSIM}$ represents MS-SSIM loss given by equation (3). Equation (2) is as follows:

$$\mathcal{L}^{l_1} = \frac{1}{N} \sum_{i \in I} |I(i) - \hat{I}(i)| \tag{2}$$

where $\hat{I}$ and $I$ are the output color image $I_{308}$ and the ground-truth image, respectively, and N is the total number of pixels in the input color image $I_{306}$. Equation (3) is as follows:

$$L^{MS\text{-}SSIM} = 1 - MS\text{-}SSIM \tag{3}$$

where MS-SSIM for pixel i is defined by equations (4)-(6). Equations (4)-(6) are as follows:

$$MS\text{-}SSIM(i) = l_M^\alpha(i) \cdot \prod_{j=1}^{M} cs_j^{\beta_j}(i) \tag{4}$$

$$l(i) = \frac{2\mu_x\mu_y + C_1}{\mu_x^2 + \mu_y^2 + C_1} \tag{5}$$

$$cs(i) = \frac{2\sigma_{xy} + C_2}{\sigma_x^2 + \sigma_y^2 + C_2} \tag{6}$$

where x and y represent two discrete non-negative signals that have been aligned with each other (e.g. two image patches extracted from a same spatial location from two images being compared, respectively); $\mu_x$, and $\mu_y$ are means, $\sigma_x$ and $\sigma_y$ are standard deviations, M is the number of levels, and $\alpha, \beta$ are the weights to adjust the contribution of each component. The means $\mu_x$, and $\mu_y$, and the standard deviations $\sigma_x$ and $\sigma_y$ are calculated with a Gaussian filter, $G_9$, with zero mean and a standard deviation $\sigma_g$. Examples of MS-SSIM are described in more detail in "Multiscale structural similarity for image quality assessment," Z. Wang, E. P. Simoncelli, A. C. Bovik, *Conference on Signals, Systems and Computers*, 2004.

Some embodiments have one or a combination of the following features and/or advantages. In an embodiment, an encoder of an encoder-decoder network is configured to output at least one feature map including global information and local information such that whether a color consistency relationship between a first portion of an input color image and a second portion of the input color image exists is encoded into the global information and the local information. A decoder of the encoder-decoder network is configured to output an output color image generated from the at least one feature map, wherein a first portion of the output color image corresponding to the first portion of the input color image and a second portion of the output color image corresponding to the second portion of the input color image are restored considering whether the color consistency relationship between the first portion of the input color image and the second portion of the input color image exists. The global information extracted by using a wider receptive field encodes information that may cause the color consistency relationship to be established, while the local information extracted by using a narrower receptive field encodes information that may cause the color consistency relationship not to be established. Therefore, color inconsistency for the situations described with reference to FIG. 1 is resolved, and further, color consistency balance for the situations described with reference to FIGS. 5 and 6 is achieved.

A person having ordinary skill in the art understands that each of the units, modules, layers, blocks, algorithm, and steps of the system or the computer-implemented method described and disclosed in the embodiments of the present disclosure are realized using hardware, firmware, software, or a combination thereof. Whether the functions run in hardware, firmware, or software depends on the condition of application and design requirement for a technical plan. A person having ordinary skill in the art can use different ways to realize the function for each specific application while such realizations should not go beyond the scope of the present disclosure.

It is understood that the disclosed system, and computer-implemented method in the embodiments of the present disclosure can be realized with other ways. The above-mentioned embodiments are exemplary only. The division of the modules is merely based on logical functions while other divisions exist in realization. The modules may or may not be physical modules. It is possible that a plurality of modules are combined or integrated into one physical module. It is also possible that any of the modules is divided into a plurality of physical modules. It is also possible that some characteristics are omitted or skipped. On the other hand, the displayed or discussed mutual coupling, direct coupling, or communicative coupling operate through some ports, devices, or modules whether indirectly or communicatively by ways of electrical, mechanical, or other kinds of forms.

The modules as separating components for explanation are or are not physically separated. The modules are located in one place or distributed on a plurality of network modules. Some or all of the modules are used according to the purposes of the embodiments.

If the software function module is realized and used and sold as a product, it can be stored in a computer readable storage medium. Based on this understanding, the technical plan proposed by the present disclosure can be essentially or partially realized as the form of a software product. Or, one part of the technical plan beneficial to the conventional technology can be realized as the form of a software product. The software product is stored in a computer readable storage medium, including a plurality of commands for at least one processor of a system to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program instructions.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A computer-implemented method, comprising:
receiving a first color image by an encoder, wherein the first color image comprises a first portion of the first color image and a second portion of the first color image located at different locations of the first color image;
processing, by the encoder, the received first color image in such a manner that whether a color consistency relationship between the first portion of the first color image and the second portion of the first color image exists is encoded into global information and local information; and
outputting, by the encoder, at least one feature map comprising the global information and the local information,
wherein:
the encoder comprises a plurality of first convolutional blocks, each of the first convolutional blocks comprises a corresponding first convolutional layer with a first receptive field, and a corresponding second convolutional layer with a second receptive field,
the first receptive field and the second receptive field of each second convolutional block of the first convolutional blocks are determined using at least one of the first receptive field and the second receptive field of a corresponding first convolutional block of the first convolutional blocks, and each second convolutional block of the first convolutional blocks is subsequent to the corresponding first convolutional block of the first convolutional blocks;
the first receptive field is wider than the second receptive field; and
the global information is obtained by the corresponding first convolutional layer of one of the first convolutional blocks, and the local information is obtained by the corresponding second convolutional layer of the one of the first convolutional blocks.

2. The computer-implemented method of claim 1, wherein spatial resolution of the at least one feature map is smaller than spatial resolution of the first color image.

3. The computer-implemented method of claim 1, wherein encoding whether the color consistency relationship between the first portion of the first color image and the second portion of the first color image exists into global information and local information, comprising:
encoding first semantics into the global information, when considering both of the first portion of the first color image and the second portion of the first color image, and when the first semantics can be attributed to the first portion of the first color image and the second portion of the first color image; and
encoding second semantics into the local information, when considering one of the first portion of the first color image and the second portion of the first color image, and when the second semantics can be attributed to the one of the first portion of the first color image and the second portion of the first color image.

4. The computer-implemented method of claim 1, further comprising:
determining the color consistency relationship between the first portion of the first color image and the second portion of the first color image exists, upon detecting at least one semantics is encoded into the global information and no semantics is encoded into the local information.

5. The computer-implemented method of claim 1, wherein the corresponding first convolutional layer of each of the first convolutional blocks is a dilated convolutional layer; and
wherein a dilation rate of the corresponding first convolutional layer of each of the first convolutional blocks is same.

6. The computer-implemented method of claim 1, wherein:
an output of the corresponding first convolutional layer of each of the first convolutional blocks is concatenated with an output of the corresponding second convolutional layer of each of the first convolutional blocks, and the concatenated output is input to a subsequent second convolutional block of the first convolutional blocks; and
the first receptive field and the second receptive field of each second convolutional block of the first convolutional blocks are determined using a mix of the first receptive field and the second receptive field of the corresponding first convolutional block of the first convolutional blocks.

7. The computer-implemented method of claim 1, further comprising:
receiving the at least one feature map by a decoder,
generating, by the decoder, a second color image from the at least one feature map, wherein a first portion of the second color image corresponding to the first portion of the first color image and a second portion of the second color image corresponding to the second portion of the first color image are restored considering whether the color consistency relationship between the first portion of the first color image and the second portion of the first color image exists, and
outputting the second color image by the decoder,
wherein:
the decoder comprises a plurality of second convolutional blocks, each of the second convolutional blocks comprises a corresponding third convolutional layer with a third receptive field,
the third receptive field of each fourth convolutional block of the second convolutional blocks is determined using the third receptive field of a corresponding third convolutional block of the second convolutional blocks, and each fourth convolutional block of the second convolutional blocks is subsequent to the corresponding third convolutional block of the second convolutional blocks.

8. The computer-implemented method of claim 7, wherein each of the second convolutional blocks further comprises a corresponding fourth convolutional layer with a fourth receptive field,
wherein one of the following:
the third receptive field and the fourth receptive field of each fourth convolutional block of the second convolutional blocks are determined correspondingly using the third receptive field and the fourth receptive field of the corresponding third convolutional block of the second convolutional blocks; and
the third receptive field and the fourth receptive field of each fourth convolutional block of the second convolutional blocks are determined using a mix of the third receptive field and the fourth receptive field of the corresponding third convolutional block of the second convolutional blocks; and
wherein the third receptive field is wider than the fourth receptive field.

9. The computer-implemented method of claim 7, wherein spatial resolution of the second color image is larger than spatial resolution of the at least one feature map.

10. A computer-implemented method, comprising:
receiving at least one feature map by a decoder, wherein the at least one feature map is extracted from a first color image, the first color image comprises a first portion of the first color image and a second portion of the first color image located at different locations of the first color image, and the at least one feature map comprising global information and local information which together indicate whether a color consistency relationship between the first portion of the first color image and the second portion of the first color image exists;
generating, by the decoder, a second color image from the at least one feature map, wherein a first portion of the second color image corresponding to the first portion of the first color image and a second portion of the second color image corresponding to the second portion of the first color image are restored considering whether the color consistency relationship between the first portion of the first color image and the second portion of the first color image exists, and
outputting the second color image by the decoder,
wherein:
the decoder comprises a plurality of first convolutional blocks, and each of the first convolutional blocks comprises a corresponding first convolutional layer with a first receptive field, and a corresponding second convolutional layer with a second receptive field,
the first receptive field and the second receptive field of each second convolutional block of the first convolutional blocks are determined using at least one of the first receptive field and the second receptive field of a corresponding first convolutional block of the first convolutional blocks, and each second convolutional block of the first convolutional blocks is subsequent to the corresponding first convolutional block of the first convolutional blocks; and
the first receptive field is wider than the second receptive field.

11. The computer-implemented method of claim 10, wherein the corresponding first convolutional layer of each of the first convolutional blocks is a dilated convolutional layer; and
wherein a dilation rate of the corresponding first convolutional layer of each of the first convolutional blocks is same.

12. The computer-implemented method of claim 10, wherein:
an output of the corresponding first convolutional layer of each of the first convolutional blocks is concatenated with an output of the corresponding second convolutional layer of each of the first convolutional blocks, and the concatenated output is input to a subsequent sound convolution block of the first convolution blocks; and
the first receptive field and the second receptive field of each second convolutional block of the first convolutional blocks are determined using a mix of the first receptive field and the second receptive field of the corresponding first convolutional block of the first convolutional blocks.

13. The computer-implemented method of claim 10, wherein spatial resolution of the second color image is larger than spatial resolution of the at least one feature map.

14. The computer-implemented method of claim 10, further comprising:
receiving the first color image by an encoder,
processing, by the encoder, the received first color image in such a manner that whether the color consistency relationship between the first portion of the first color image and the second portion of the first color image exists is encoded into the global information and the local information, to obtain the at least one feature map, and
outputting, by the encoder, the at least one feature map, wherein:
the encoder comprises a plurality of second convolutional blocks, and each of the second convolutional blocks comprises a corresponding third convolutional layer with a third receptive field, and a corresponding fourth convolutional layer with a fourth receptive field,
the third receptive field and the fourth receptive field of each fourth convolutional block of the second convolutional blocks are determined using at least one of the third receptive field and the fourth receptive field of a corresponding third convolutional block of the second convolutional blocks, and each fourth convolutional block of the second convolutional blocks is subsequent to the corresponding third convolutional block of the second convolutional blocks;
the third receptive field is wider than the fourth receptive field; and
the global information is obtained by the corresponding third convolutional layer of one of the second convolutional blocks, and the local information is obtained by the corresponding fourth convolutional layer of the one of the second convolutional blocks.

15. The computer-implemented method of claim 13, wherein the spatial resolution of the at least one feature map is smaller than spatial resolution of the first color image.

16. The computer-implemented method of claim 13, wherein encoding whether the color consistency relationship between the first portion of the first color image and the second portion of the first color image exists into global information and local information, comprising:
encoding first semantics into the global information, when considering both of the first portion of the first color image and the second portion of the first color image, and when the first semantics can be attributed to the first portion of the first color image and the second portion of the first color image, and
encoding second semantics into the local information, when considering one of the first portion of the first color image and the second portion of the first color image, and when the second semantics can be attributed to the one of the first portion of the first color image and the second portion of the first color image.

17. A terminal, comprising:
at least one memory configured to store program instructions;
at least one processor configured to execute the program instructions which, when being executed by the at least one memory, cause the at least one processor to perform steps comprising:
receiving a first color image by an encoder, wherein the first color image comprises at least two portions of the first color image located at different locations of the first color image;
encoding whether a color consistency relationship between the at least two portions of the first color image exists into global information and local information; and
outputting, by the encoder, at least one feature map comprising the global information and the local information,
wherein:
the encoder comprises a plurality of first convolutional blocks, each of the first convolutional blocks comprises a corresponding first convolutional layer with a first receptive field, and a corresponding second convolutional layer with a second receptive field,
the first receptive field and the second receptive field of each second convolutional block of the first convolutional blocks are determined using at least one of the first receptive field and the second receptive field of a corresponding first convolutional block of the first convolutional blocks, and each second convolutional block of the first convolutional blocks is subsequent to the corresponding first convolutional block of the first convolutional blocks;
the first receptive field is wider than the second receptive field; and
the global information is obtained by the corresponding first convolutional layer of one of the first convolutional blocks, and the local information is obtained by the corresponding second convolutional layer of the one of the first convolutional blocks.

18. The terminal of claim 17, wherein the steps further comprise:
receiving the at least one feature map by a decoder,
generating, by the decoder, a second color image from the at least one feature map, wherein at least two portions of the second color image respectively corresponding to the at least two portions of the first color image are restored considering whether the color consistency relationship between the at least two portions of the first color image exists, and
outputting, by the decoder, the second color image by the decoder,
wherein:
the decoder comprises a plurality of second convolutional blocks, each of the second convolutional blocks comprises a corresponding third convolutional layer with a third receptive field,
the third receptive field of each fourth convolutional block of the second convolutional blocks is determined using the third receptive field of a corresponding third convolutional block of the second convolutional blocks, and each fourth convolutional block of the second convolutional blocks is subsequent to the corresponding third convolutional block of the second convolutional blocks.

19. A terminal, comprising:
at least one memory configured to store program instructions;
at least one processor configured to execute the program instructions which, when being executed by the at least one memory, cause the at least one processor to perform steps comprising:
receiving at least one feature map by a decoder, wherein the at least one feature map is extracted from a first color image, the first color image comprises at least two portions of the first color image located at different locations of the first color image, and the at least one feature map comprising global information and local information which together indicate whether a color consistency relationship between the at least two portions of the first color image exists;

generating, by the decoder, a second color image from the at least one feature map, wherein the at least two portions of the second color image respectively corresponding to the at least two portions of the first color image are restored considering whether the color consistency relationship between the at least two portions of the first color image exists, and outputting the second color image by the decoder, wherein:

the decoder comprises a plurality of first convolutional blocks, wherein each of the first convolutional blocks comprises a corresponding first convolutional layer with a first receptive field, and a corresponding second convolutional layer with a second receptive field, the first receptive field and the second receptive field of each second convolutional block of the first convolutional blocks are determined using at least one of the first receptive field and the second receptive field of a corresponding first convolutional block of the first convolutional blocks, and each second convolutional block of the first convolutional blocks is subsequent to the corresponding first convolutional block of the first convolutional blocks; and the first receptive field is wider than the second receptive field.

20. The terminal of claim 19, wherein the steps further comprise:

determining the color consistency relationship between the at least two portions of the first color image exists, upon detecting at least one semantics is encoded into the global information and no semantics is encoded into the local information.

* * * * *